(12) United States Patent
Mayer et al.

(10) Patent No.: US 10,005,475 B2
(45) Date of Patent: Jun. 26, 2018

(54) INTELLIGENT REFUELLING AND/OR RECHARGING MESSAGE

(71) Applicant: AUDI AG, Ingolstadt (DE)

(72) Inventors: Stefan Mayer, Gaimersheim (DE); Christine Ullmann, Westerroenfeld (DE); Hannes Mögele, Guenzach (DE); Andreas Blattner, Mainburg (DE)

(73) Assignee: AUDI AG, Ingolstadt (DE)

( * ) Notice: Subject to any disclaimer, the term of this patent is extended or adjusted under 35 U.S.C. 154(b) by 0 days. days.

(21) Appl. No.: 15/506,601

(22) PCT Filed: Jun. 25, 2015

(86) PCT No.: PCT/EP2015/001282
§ 371 (c)(1),
(2) Date: Feb. 24, 2017

(87) PCT Pub. No.: WO2016/062360
PCT Pub. Date: Apr. 28, 2016

(65) Prior Publication Data
US 2017/0305439 A1    Oct. 26, 2017

(30) Foreign Application Priority Data
Oct. 25, 2014   (DE) .................. 10 2014 015 852

(51) Int. Cl.
*G06F 19/00*    (2018.01)
*G06G 7/70*    (2006.01)
(Continued)

(52) U.S. Cl.
CPC ............ *B60W 50/14* (2013.01); *B60W 50/16* (2013.01); *B60K 2350/1092* (2013.01);
(Continued)

(58) Field of Classification Search
CPC .. B60K 2350/1092; B60Q 1/00; G01C 21/36; B60W 50/14; B60W 50/16
(Continued)

(56) References Cited

U.S. PATENT DOCUMENTS

2010/0148952 A1*  6/2010  Barajas ................. B60R 25/00
                                                                340/450.2
2012/0041626 A1    2/2012  Kelty et al.
(Continued)

FOREIGN PATENT DOCUMENTS

CN   101153805   4/2008
CN   101504297   8/2009
(Continued)

OTHER PUBLICATIONS

German Office Action dated Mar. 2, 2015 from German Patent Application No. 10 2014 015 852.7, 7 pages.
(Continued)

*Primary Examiner* — Mahmoud S Ismail
(74) *Attorney, Agent, or Firm* — Staas & Halsey LLP

(57) ABSTRACT

A motor vehicle includes a driver assistance system having a display unit and an evaluation unit for generating and displaying a refueling and/or recharging message which is generated in dependence on and independently of a fuel tank filling level or a state of charge of a battery and can be displayed for a defined time period. The evaluation unit is configured to check for the presence of conditions which are to be predefined, and given the presence of at least one condition, to generate a refueling and/or recharging message and to output the refueling and/or recharging message via the display unit.

20 Claims, 1 Drawing Sheet

(51) Int. Cl.
    *G06G 7/76* (2006.01)
    *B60W 50/14* (2012.01)
    *B60W 50/16* (2012.01)
    *B60W 40/08* (2012.01)
    *B60Q 1/00* (2006.01)
    *G01C 21/36* (2006.01)

(52) U.S. Cl.
    CPC ....... *B60Q 1/00* (2013.01); *B60W 2040/0881* (2013.01); *B60W 2050/143* (2013.01); *B60W 2050/146* (2013.01); *B60W 2510/244* (2013.01); *B60W 2540/04* (2013.01); *B60W 2550/40* (2013.01); *B60W 2560/02* (2013.01); *G01C 21/36* (2013.01)

(58) Field of Classification Search
    USPC .............................. 701/123, 426; 340/450.2
    See application file for complete search history.

(56) References Cited

U.S. PATENT DOCUMENTS

| | | | |
|---|---|---|---|
| 2012/0116670 A1* | 5/2012 | Rosekrans | G01C 21/3469 701/426 |
| 2013/0151049 A1* | 6/2013 | Higashitani | B60W 10/08 701/22 |
| 2016/0088787 A1* | 3/2016 | Connell | A01B 76/00 701/50 |

FOREIGN PATENT DOCUMENTS

| | | |
|---|---|---|
| DE | 199 52 506 C1 | 6/2001 |
| DE | 603 14 935 T2 | 12/2007 |
| DE | 11 2007 000 756 T5 | 2/2009 |
| DE | 10 2010 039 075 A1 | 2/2011 |
| DE | 11 2009 000 157 T5 | 2/2011 |
| DE | 11 2009 000 257 T5 | 2/2011 |
| DE | 10 2009 059 870 A1 | 6/2011 |
| DE | 10 2010 043 690 A1 | 5/2012 |
| DE | 10 2011 076 678 A1 | 5/2012 |
| DE | 10 2012 211 414 A1 | 1/2013 |
| DE | 10 2012 005 674 | 4/2013 |
| DE | 10 2012 005 674 A1 | 4/2013 |
| DE | 10 2012 223 315 A1 | 7/2013 |
| DE | 10 2012 219 923 A1 | 4/2014 |
| EP | 1 754 622 | 2/2007 |
| EP | 1 754 622 A1 | 2/2007 |
| EP | 2 772 380 A1 | 9/2014 |
| FR | 2 976 888 A1 | 12/2012 |
| FR | 2 976 889 A1 | 12/2012 |
| WO | 2014/033380 A1 | 3/2014 |

OTHER PUBLICATIONS

International Search Report dated Oct. 28, 2015 from International Patent Application No. PCT/EP2015/001282, 3 pages.
PCT/EP2015/001282, filed Jun. 25, 2015, Stefan Mayer, Audi AG.
DE 10 2014 015 852.7, filed Oct. 25, 2014, Stefan Mayer, Audi AG.
English Translation of the International Preliminary Report on Patentability dated Apr. 27, 2017 from International Patent Application No. PCT/EP2015/001282, 6 pages.
Chinese Office Action dated Nov. 15, 2017 from Chinese Patent Application No. 201580043303.4, 7 pages.

* cited by examiner

INTELLIGENT REFUELLING AND/OR RECHARGING MESSAGE

CROSS REFERENCE TO RELATED APPLICATIONS

This application is a U.S. national stage of International Application No. PCT/EP2015/001282, filed on Jun. 25, 2015. The International Application claims the priority benefit of German Application No. 10 2014 015 852.7 filed on Oct. 25, 2014. Both the International Application and German Application are incorporated by reference herein in their entirety.

BACKGROUND

Described herein is a driver assistance system in a vehicle, that generates an intelligent refueling and/or recharging message.

Driver assistance systems are widespread in modern vehicles and assist the driver in controlling the vehicle. In addition, driver assistance systems include entertainment electronics systems and navigation systems. In general, driver assistance systems supply the driver with information about the state of the vehicle and the components thereof, that is to say also about the filling level of a vehicle fuel tank, and usually output a visual and/or acoustic signal when the filling level drops below a minimum filling quantity. This refueling message is retained for the time period until the vehicle has been refueled and the filling level has exceeded the minimum filling quantity. In vehicles with an electronic drive, these messages relate to the state of charge of the vehicle batteries or of vehicle accumulators.

German Patent Application No. 11 2009 000 257 T5 describes a system for determining a vehicle refueling strategy. The system includes one or more computers which are configured to select, for a specified route which is to be traveled along during a multi-day time period, (i) at least one day during the multi-day time period on which fuel is to be purchased, (ii) to select at least one refueling station along the route at which fuel is to be purchased for each selected day, and (iii) to determine a quantity of fuel which is to be purchased at each selected refueling station. The selection and the determination are based on present and predicted fuel prices for the multi-day time period, in order generally to minimize refueling costs for the specified route.

German Patent Application No. 10 2009 059 870 A1 describes a method for displaying information in a vehicle. According to the method a user input is registered, information is produced by using the user input, and an assigned display condition is defined. Subsequently, the information is stored with the assigned display condition, and the information is displayed if the display condition which is defined by the user is satisfied. In addition, a device for displaying information in a vehicle is described, the device including an input device for inputting information and assigned display conditions, a memory unit for storing the specified information with the assigned display conditions, a display surface, and a control device which is coupled to the memory unit of the display surface and with which the display on the display surface can be controlled.

German Patent Application No. 10 2012 219 929 A1 describes a vehicle assistance device having a control apparatus for generating data which provides recommendations for action for a vehicle occupant, a display device for displaying the recommendations as a function of the data generated by the control apparatus, an identification apparatus for identifying the vehicle occupant, a memory apparatus having a first memory for storing a first parameter which defines a state, and a second and third parameter assigned to the first parameter. The second parameter characterizes the vehicle occupant, and third parameter specifies a mode of behavior of the vehicle occupant in the state. The control apparatus is designed to determine whether the state which is stored in the first memory is present and to generate the data for display on the display apparatus as a function of the third parameter which is assigned to the first parameter, if the control apparatus detects the state which is characterized by the first parameter, and the vehicle occupant which is identified by the identification apparatus corresponds to the vehicle occupant which is characterized by the second parameter.

A disadvantage with the known systems with respect to a refueling message is that the refueling message is triggered exclusively when the filling level drops below a minimum filling quantity of the vehicle fuel tank and is retained until the vehicle is refueled. Destinations and driving situations as well as personal stipulations of the driver are not taken into account.

SUMMARY

Accordingly, an aspect of the driver assistance system described herein is to make available a possible way of also taking into account destinations, driving situations and/or personal stipulations of the driver when outputting refueling messages.

This may be achieved by the driver assistance system described herein, and by a corresponding method implemented by the driver assistance system. Further refinements of the driver assistance system can be found in the figures and the description herein.

According to a vehicle assistance system described herein, an intelligent refueling message is generated and informs the driver as to whether destinations have been reached yet or whether there is a preferred refueling possibility in the immediate surroundings. In the following statements relating to the description, the term "refueling message" does not refer exclusively to the filling level of a liquid fuel, such as gasoline or diesel in a vehicle fuel tank in the case of a motor vehicle with an internal combustion engine, but explicitly also to a state of charge of a vehicle battery and/or vehicle accumulator in the case of a vehicle with an electric drive. In addition, the term "refueling message" also refers to a gas fuel tank system in the case of a vehicle with a gas drive.

The driver assistance system described herein has a display unit and an evaluation unit for generating and for displaying a refueling message. The refueling message is generated in dependence on and independently of a fuel tank filling level and can be displayed for a time period which is to be predefined. The evaluation unit is configured here to check for the presence of conditions which are to be predefined, and given the presence of at least one condition, to generate on the basis thereof a refueling message and to output the refueling message via the display unit for the predefined time period.

In one possible refinement, the conditions which are to be predefined take into account, for example, the possibility of reaching current and/or future destinations, an instantaneous driving situation, a number of persons in the vehicle or personal stipulations of the driver.

In a further refinement of the driver assistance system described herein, the driver assistance system has an input unit via which the personal stipulations of the driver are to be input.

The instantaneous driving situation is generally derived from data which is determined by one or more driver assistance system surroundings sensors and which is made available to the evaluation unit. The conditions to be checked by the evaluation unit, for example may be checked at predefinable time intervals. For example, the conditions to be checked by the evaluation unit may be checked at, if appropriate, regular, time intervals. The conditions to be checked by the evaluation unit do not all have to be input by, for example, a driver via the input unit but instead can also be learnt by the driver assistance system by using a characteristic behavior of the driver.

A refueling message which is to be output can occur here acoustically, graphically, visually, by vibrations and/or haptically.

The "instantaneous driving situation" can be determined, for example, by using the driver assistance system surroundings sensors which are referred to and can be compared with "driving situations" which are stored in the driver assistance system, e.g., in a corresponding memory medium. When there is correspondence with one of these stored "driving situations", a condition is satisfied which causes an individual refueling message to be generated and output via the display unit, or is intentionally not actually output, such as, for example, in a critical driving situation.

A number of persons in the vehicle can be determined, for example, by using weight sensors which are integrated into respective seats of the vehicle. For each number of persons it is possible to store a corresponding individual refueling message which is correspondingly output when there is a specific number of occupants present. Generally, a plurality of facts or influencing factors are linked in combination to a refueling message as a condition for the display thereof. In this manner, a specific distance to the destination at which a refueling message is output can be linked to a respective number of vehicle occupants. This means that given a defined number X1 of vehicle occupants at a specific distance Y1, stored for this number X1, from the destination one refueling message is issued, while given a different number X2 of vehicle occupants, where possible at a different distance Y2 from the destination, a possibly different refueling message is issued.

In addition, in one possible refinement the refueling messages are displayed in a navigation system of the vehicle and for example may contain an indication of distance from the nearest refueling station as well as the associated price information for the required fuel.

If a critical fuel tank filling level is reached, according to one possible refinement of the driver assistance system described herein a refueling message which is generated and output or displayed has to be confirmed by the driver.

BRIEF DESCRIPTION OF THE DRAWINGS

These and other aspects and advantages will become more apparent and more readily appreciated from the following description of the exemplary embodiments, taken in conjunction with reference to the drawings, of which.

DETAILED DESCRIPTION OF THE PREFERRED EMBODIMENT

Figure 1:
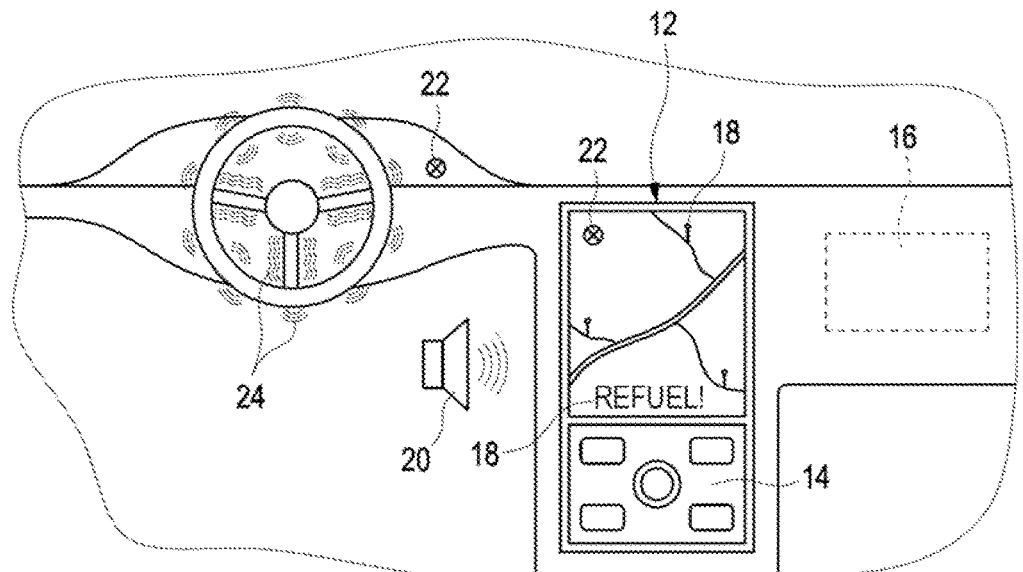
FIG. 1 is a schematic illustration of a vehicle cockpit with components of an embodiment of the driver assistance system described herein.

Reference will now be made in detail to the example embodiments which are illustrated in the accompanying drawings, wherein like reference numerals refer to like elements throughout.

Further advantages and refinements can be found in the description and the accompanying drawings.

Of course, the features which are described above and which are still to be explained below can be used not only in the respectively specified combination but also in other combinations or alone without departing from the scope of the disclosure.

A schematic illustration provided in FIG. 1 illustrates a vehicle cockpit with components of a driver assistance system. The driver assistance system has a display unit 12. The display unit 12 can be here a screen as part of a navigation system. An evaluation unit 16, which is configured to check conditions which are to be predefined is also indicated. An individual refueling message 18 may be generated on the basis of the check and when at least one condition is satisfied. This refueling message 18 can be output to a driver via, for example, the display unit 12.

Figure 2:
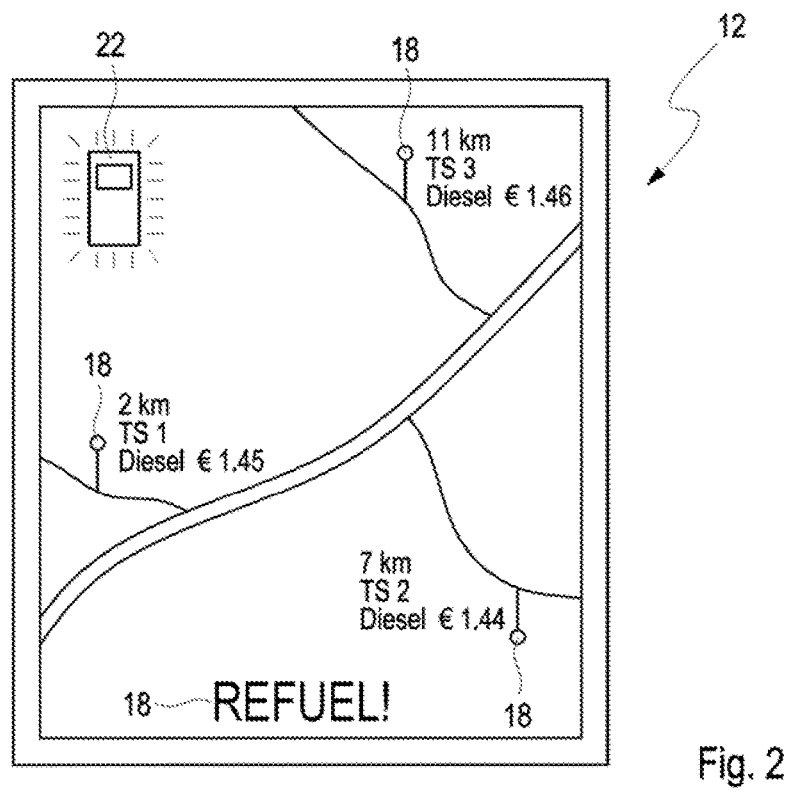
FIG. 2 is an example of a navigation screen as part of the embodiment of the driver assistance system from FIG. 1.

Facts and influencing factors which are taken into account for the conditions and therefore also for their evaluation can include, for example, future destinations. For example, a condition can be stored that a refueling message is to be generated if the distance which can be covered with the fuel which is still present in a fuel tank of the vehicle is less than a future route, stored in the navigation system of the vehicle, to a destination. If either the driver assistance system or the evaluation unit 16 detects that a future destination is reached only with a refueling stop which is to be scheduled, the evaluation unit 16 generates a refueling message 18 which informs the driver about this. The message is also generated when, for example, the fuel tank filling level has not yet dropped below a minimum filling quantity of a vehicle fuel tank. However, the method of outputting differs depending on how much fuel is still present in the vehicle fuel tank. Initially, a refueling message which states that it is necessary to refuel during the journey is, for example, output only temporarily at time intervals, for example by including a short text message or a symbol which appears temporarily on a display of the display unit. If the fuel in the vehicle fuel tank decreases, the refueling message is, for example, supported by an acoustic signal and/or refueling stations in the surroundings are displayed on a map in the navigation menu, as is outlined, for example, in FIG. 2. In addition, a constant display of the refueling message may then also occur.

A further stored condition can take into account an instantaneous driving situation. For example, a refueling message is not to be output during a critical driving situation. By using sensors, the driver assistance system can derive a critical driving situation, for example by using a bend profile of the section of road, a distance from vehicles traveling ahead and/or behind, the velocity or how firmly the steering wheel is being gripped. If the system detects that such a critical driving situation is present and if the fuel tank filling level reaches a point at which in a normal situation a refueling message would be generated, a refueling message 18 remains suppressed during a critical driving situation and is not output until after the situation has eased.

It is also conceivable that a number of persons in the vehicle is taken into account for one of the conditions. The corresponding condition can be, for example, that if just one person is located in the vehicle, specifically the driver, a generated refueling message which is to be output is supported by a corresponding acoustic indication and/or a voice output. If the system detects that just one person, specifically the driver, is located in the vehicle, the system assists a generated refueling message 18 which is to be output by using an additional voice output 20 and/or a corresponding acoustic indication.

Personal stipulations of the driver can also be taken into account. Personal stipulations of the driver can be transferred, for example, via an input unit 14 to the driver assistance system or can be learnt by using repeated characteristic behavior of the driver assistance system. The personal stipulations include, for example, price ranges within which the driver would preferably like to refuel the vehicle. If the driver assistance system detects, via a mobile data link, that a refueling station in the surrounding area offers fuel in this price range, a refueling message 18 can be generated without refueling being absolutely necessary. Refueling messages 18 can also be provided with a refueling suggestion with prices. Refueling suggestions can concentrate on brands which are preferred by the driver and can contain information about prices and a possible deviation from the planned route. When refueling stations are displayed on a navigation screen, preferred brands can be emphasized and other non-preferred brands can be displayed in a less pronounced color scheme.

Further conditions are conceivable and do not depart from the scope of the disclosure.

In a further refinement it is conceivable for refueling messages 18 to be output by using various options. For example, an acoustic tone 20, which signals the need for refueling to the driver, is conceivable. Likewise, the refueling message can include a visual signal 22 in that, for example, a light lights up in the display unit. Graphic messages, for example in the screen of a navigation system, are also conceivable. If the remaining quantity in the vehicle fuel tank is critical, a vibration 24, for example of a steering wheel, can also occur in order to alert the driver to the situation. A refueling message 18 can also be output in a combination of the specified options.

If the driver assistance system detects, after the starting of the vehicle, that the vehicle has to be refueled and if the remaining range is small, a refueling message can be issued which the driver has to confirm.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A driver assistance system in a vehicle having at least one of a fuel tank and a battery, the driver assistance system comprising:
    a display; and
    an evaluation unit, comprising a processor, configured to:
        check for existence of predefined conditions,
        generate at least one of a refueling message and a recharging message, when at least one of the predefined conditions exists, and in dependence on and independently of, a filling level of the fuel tank or a state of charge of the battery, the generation of the at least one of the refueling message and the recharging message being suppressed by the evaluation unit when a critical driving situation is recognized by the driver assistance system until after the driver assistance system determines the critical driving situation has ended,
        control the display to display the at least one of the refueling message and the recharging message for a predefined time period, the display of the at least one of the refueling message and the recharging message being suppressed by the evaluation unit when the critical driving situation is recognized by the driver assistance system until after the driver assistance system determines the critical driving situation has ended, and
        output the at least one of the refueling message and the recharging message via the display by vibration and/or haptically, the output of the at least one of the refueling message and the recharging message being suppressed by the evaluation unit when the critical driving situation is recognized by the driver assistance system until after the driver assistance system determines the critical driving situation has ended.

2. The driver assistance system as claimed in claim 1, wherein
    the vehicle has one or more driver assistance surroundings sensors, and
    the predefined conditions include at least one of a possibility of reaching a current destination, a possibility of reaching a future destination, an instantaneous driving situation derived from data of one or more of the driver assistance surroundings sensors, a number of persons in the vehicle, and personal stipulations of a driver.

3. The driver assistance system as claimed in claim 2, further comprising an input unit configured to receive an input,
    wherein the personal stipulations of the driver are input via the input unit or are learnt by the driver assistance system from a behavior and from preferences of the driver.

4. The driver assistance system as claimed in claim 1, wherein the at least one of the refueling message and the recharging message are further output acoustically, graphically, visually and/or by voice.

5. The driver assistance system as claimed in claim 1, wherein the at least one of the refueling message and the recharging message requires confirmation by a driver when the filling level of the fuel tank or the state of charge of the battery is below a predetermined threshold.

6. The driver assistance system as claimed in claim 4, wherein
    the vehicle has a navigation system, and
    the display displays the at least one of the refueling message and the recharging message as a graphic refueling message and/or a graphic recharging message, including an indication of distance, in the navigation system of the vehicle.

7. The driver assistance system as claimed in claim 1, wherein the driver assistance system receives information about at least one of refueling stations and recharging stations in a surrounding area via a mobile data link.

8. A method for generating and displaying at least one of a refueling message and a recharging message in a motor vehicle, the method comprising:
    checking, by a driver assistance system, for existence of one or more predefined conditions;

generating, when at least one of the predefined conditions exists, and in dependence on and independently of, a fuel tank filling level of the motor vehicle or a state of charge of a battery of the motor vehicle, the at least one of the refueling message and the recharging message, the generating of the at least one of the refueling message and the recharging message being suppressed by the driver assistance system when a critical driving situation is recognized by the driver assistance system until after the driver assistance system determines the critical driving situation has ended; and outputting the at least one of the refueling message and the recharging message in at least one defined time interval, by vibration and/or haptically, the outputting of the at least one of the refueling message and the recharging message being suppressed by the driver assistance system when the critical driving situation is recognized by the driver assistance system until after the driver assistance system determines the critical driving situation has ended.

9. The method as claimed in claim 8, wherein the one or more predefined conditions include at least one of a possibility of reaching a current destination, a future destination, an instantaneous driving situation derived from data of one or more driver assistance surroundings sensors, a number of persons in the vehicle, and personal stipulations of a driver.

10. The method as claimed in claim 9, wherein the personal stipulations of the driver are input via an input unit or are learnt by the driver assistance system from a behavior and from preferences of the driver.

11. The method as claimed in claim 8, further comprising outputting the at least one of the refueling message and the recharging message acoustically, graphically, visually and/or by voice.

12. The method as claimed in claim 8, further comprising requesting a driver to confirm the at least one of the refueling message and the recharging message, when the filling level of the tank or the state of the charge of the battery is below a predetermined threshold.

13. The method as claimed in claim 11, wherein the at least one of the refueling message and the recharging message are displayed as a graphic refueling message and/or a graphic recharging message, including an indication of distance, in a navigation system of the vehicle.

14. The method as claimed in claim 8, further comprising receiving, via a mobile data link, information about at least one of refueling stations and charging stations in a surrounding area.

15. A motor vehicle, comprising:
a chassis;
at least one of a fuel tank and a battery; and
a driver assistance system including:
a display; and
an evaluation unit, comprising a processor, configured to:
check for existence of predefined conditions,
generate at least one of a refueling message and a recharging message, when at least one of the predefined conditions exists, and in dependence on and independently of, a filling level of the fuel tank or a state of charge of the battery, the generation of the at least one of the refueling message and the recharging message being suppressed by the evaluation unit when a critical driving situation is recognized by the driver assistance system until after the driver assistance system determines the critical driving situation has ended, control the display to display the at least one of the refueling message and the recharging message for a predefined time period, the display of the at least one of the refueling message and the recharging message being suppressed by the evaluation unit when the critical driving situation is recognized by the driver assistance system until after the driver assistance system determines the critical driving situation has ended, and output the at least one of the refueling message and the recharging message via the display by vibration and/or haptically, the output of the at least one of the refueling message and the recharging message being suppressed by the evaluation unit when the critical driving situation is recognized by the driver assistance system until after the driver assistance system determines the critical driving situation has ended.

16. The motor vehicle as claimed in claim 15, further comprising a steering wheel,
wherein the evaluation unit outputs the at least one of the refueling message and the recharging message via the display by vibrating the steering wheel.

17. The motor vehicle as claimed in claim 15, wherein
the predefined conditions include at least one of a possibility of reaching a current destination based on at least one of a current filling level of the fuel tank and a current state of charge of the battery, and
the evaluation unit generates the at least one of the refueling message and the recharging message when a distance to be traveled to the current destination cannot be reached based on the at least one of the current filling level of the fuel tank and the current state of charge of the battery.

18. The motor vehicle as claimed in claim 17, wherein the evaluation unit generates the at least one of the refueling message and the recharging message when the distance to be traveled to the current destination cannot be reached based on the at least one of the current filling level of the fuel tank and the current state of charge of the battery, independently of whether the filling level of the fuel tank or the state of charge of the battery is below a predetermined minimum value.

19. The motor vehicle as claimed in claim 15, further comprising a steering wheel,
wherein the driver assistance system recognizes the critical driving situation based on at least one of a bend profile of a section of a road currently being traveled on by the motor vehicle, a distance from another vehicle, a velocity, and how firmly a steering wheel is being gripped by the driver.

20. The motor vehicle as claimed in claim 15, wherein
the display is included in a navigation system of the motor vehicle,
when the filling level of the fuel tank or the state of charge of the battery is a first amount greater than a predetermined threshold, the evaluation unit is configured to control the display to display the at least one of the refueling message and the recharging message temporarily at preset time intervals, and when the filling level of the fuel tank or the state of charge of the battery is a second amount less than the predetermined threshold, the evaluation unit is configured to control the display to display the at least one of the refueling message and the recharging message constantly and to control the display to display one or more refueling stations on a map in the navigation system.

* * * * *